US012752448B2

(12) United States Patent
Gross

(10) Patent No.: US 12,752,448 B2
(45) Date of Patent: Oct. 6, 2026

(54) MAGNETIC MOUNTING ASSEMBLY

(71) Applicant: Andis Company, Sturtevant, WI (US)

(72) Inventor: Nicholas David Gross, Burlington, WI (US)

(73) Assignee: Andis Company, Sturtevant, WI (US)

( * ) Notice: Subject to any disclaimer, the term of this patent is extended or adjusted under 35 U.S.C. 154(b) by 134 days.

(21) Appl. No.: 18/745,516

(22) Filed: Jun. 17, 2024

(65) Prior Publication Data

US 2025/0381686 A1 Dec. 18, 2025

(51) Int. Cl.
*B26B 19/06* (2006.01)
*B26B 19/20* (2006.01)
*B26B 19/38* (2006.01)

(52) U.S. Cl.
CPC ............ *B26B 19/06* (2013.01); *B26B 19/205* (2013.01); *B26B 19/3846* (2013.01); *B26B 19/386* (2013.01)

(58) Field of Classification Search
CPC ... B26B 19/205; B26B 19/06; B26B 19/3846; B26B 19/386; B26B 19/02; B26B 19/04; B26B 19/063; B26B 19/20; B26B 19/22
USPC ........................... 30/201, 195, 200, 208, 209
See application file for complete search history.

(56) References Cited

U.S. PATENT DOCUMENTS 658,094 A 9/1900 Palmer
4,059,891 A 11/1977 Panagiotoulis
4,989,324 A 2/1991 Andis
7,234,242 B2 6/2007 Yao
8,341,846 B1 1/2013 Holmes
9,943,972 B2 4/2018 Werner
11,504,864 B2 11/2022 Werner et al.
2007/0107234 A1 5/2007 Yao
2009/0019706 A1 1/2009 Werner et al.
2009/0199413 A1 8/2009 Tautscher et al.
2013/0219724 A1 8/2013 Werner
2013/0312265 A1 11/2013 Wilson et al.
2014/0117788 A1 5/2014 Takahashi et al.
(Continued)

FOREIGN PATENT DOCUMENTS

CN 101432104 5/2009
CN 102909733 2/2013
(Continued)

OTHER PUBLICATIONS

International Search Report and Written Opinion for International Application No. PCT/US2023/033699, dated Jan. 23, 2024, 11 pages.

(Continued)

*Primary Examiner* — Phong H Nguyen
(74) *Attorney, Agent, or Firm* — Reinhart Boerner Van Deuren s.c.

(57) ABSTRACT

A hair cutting device with an adjustable blade assembly is provided. A mounting bracket captures at least a portion of a blade assembly and blade bracket extends around the mounting bracket and is adjustable to change the position of the mounting bracket. A magnet is positioned within the mounting bracket to provide a magnetic force between the mounting bracket and the blade bracket. The magnetic force provides a smooth and consistent movement of the mounting bracket relative to the blade bracket and/or blade assembly.

20 Claims, 19 Drawing Sheets

(56) References Cited

U.S. PATENT DOCUMENTS

| | | | | |
|---|---|---|---|---|
| 2016/0075039 | A1 | 3/2016 | Werner | |
| 2017/0019044 | A1 | 1/2017 | Godlieb et al. | |
| 2017/0348865 | A1 | 12/2017 | Werner | |
| 2020/0055205 | A1 | 2/2020 | Werner et al. | |
| 2022/0134587 | A1 | 5/2022 | Hahn et al. | |
| 2023/0023892 | A1 | 1/2023 | Werner et al. | |
| 2023/0120824 | A1 * | 4/2023 | Werner | B26B 19/06 30/201 |
| 2023/0130022 | A1 * | 4/2023 | Lin | B26B 19/3873 30/34.05 |
| 2024/0109210 | A1 | 4/2024 | Tringali et al. | |

FOREIGN PATENT DOCUMENTS

| | | |
|---|---|---|
| CN | 203185375 | 9/2013 |
| CN | 104128936 | 11/2014 |
| CN | 104369216 | 2/2015 |
| CN | 204913971 | 12/2015 |
| CN | 106103018 | 11/2016 |
| CN | 108274496 | 7/2018 |
| CN | 108972636 | 12/2018 |
| CN | 117001722 | 11/2023 |
| EP | 1974875 | 10/2008 |
| JP | S54-103159 | 8/1979 |
| JP | 2009-535143 | 10/2009 |
| WO | WO2017/120610 | 7/2017 |

OTHER PUBLICATIONS

International Searching Authority, "International Search Report and Written Opinion," issued in connection with International Patent Application No. PCT/US2019/046656, 13 pages.
Partial Supplementary European Search Report for European Application No. 19850550.5, dated Mar. 18, 2022, 10 pages.
Machine Translation of EP1974875 generated by Patent Translate at https://translationportal.epo.org/emtp/translate/?ACTION=description-retrieval&COUNTRY=EP&ENGINE=google&FORMAT=docdb&KIND=A1&LOCALE=en_EP&NUMBER=1974875&OPS=ops.epo.org/3.2&SRCLANG=de&TRGLANG=en, 8 pages.
CN 104369216 Translation (Year: 2023).
International Search Report and Written Opinion for International Application No. PCT/US2025/033328, dated Oct. 16, 2025, 11 pages.

* cited by examiner

MAGNETIC MOUNTING ASSEMBLY

BACKGROUND OF THE INVENTION

The present invention relates generally to the field of hair clippers or a hair cutting apparatus. The present invention relates specifically to an adjustable magnetic assembly configured to adjust a blade gap between a reciprocating blade and a stationary blade of a blade assembly. Specifically, a magnetic system is configured to provide a force between components of a mounting assembly.

SUMMARY OF THE INVENTION

One embodiment of the invention relates to a blade assembly. The blade assembly includes an outer blade having outer blade teeth and an inner blade supported relative to the outer blade. The inner blade has inner blade teeth having a parallel orientation to the outer blade teeth such that the inner blade teeth are moveable over the outer blade to cut hair. A yoke is coupled to the inner blade. The yoke is configured to move the inner blade relative to the outer blade. The blade assembly further includes a mounting bracket configured to guide the yoke, a blade bracket, and a magnet. The blade bracket extends around the mounting bracket. The magnet generates an attractive force between the mounting bracket and the blade bracket.

Another embodiment of the invention relates to a magnetic mounting assembly. The magnetic mounting assembly includes an outer blade having outer blade teeth and an inner blade supported relative to the outer blade. The inner blade has inner blade teeth having a parallel orientation to the outer blade teeth such that the inner blade teeth are moveable over the outer blade to cut hair. A yoke is coupled to the inner blade. The blade assembly further includes a mounting bracket configured to engage the yoke, a blade bracket, and a magnet. The blade bracket extends around the mounting bracket and is coupled to the outer blade. The magnet generates a force between the mounting bracket and the blade bracket. The magnetic mounting assembly includes a lever coupled to the mounting bracket and the blade bracket. The lever is pivotable such that a distance between the inner blade teeth and the outer blade teeth is adjustable.

Another embodiment of the invention relates to a blade assembly. The blade assembly includes an outer blade having outer blade teeth and an inner blade supported relative to the outer blade. The inner blade has inner blade teeth having a parallel orientation to the outer blade teeth such that the inner blade teeth are moveable over the outer blade to cut hair. The blade assembly includes a yoke and a mounting bracket. The yoke is coupled to the inner blade. The mounting bracket is configured to engage the yoke. The blade assembly further includes a bracket coupled to the mounting bracket and a magnet positioned within at least one of the bracket and the mounting bracket. The magnet is located above the outer blade. The blade assembly includes a lever coupled to the mounting bracket, the lever is pivotable such that a distance between the inner blade teeth and the outer blade teeth is adjustable.

The blade assembly further includes a blade bracket, a magnet, and a lever. The blade bracket extends around the mounting bracket. The magnet generates a force between the mounting bracket and the blade bracket. The lever is pivotable such that a distance between the inner blade teeth and the outer blade teeth is adjustable.

Additional features and advantages will be set forth in the detailed description which follows and will be readily apparent to those skilled in the art from the description or recognized by practicing the embodiments as described in the written description and/or shown in the accompany drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments. In addition, alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
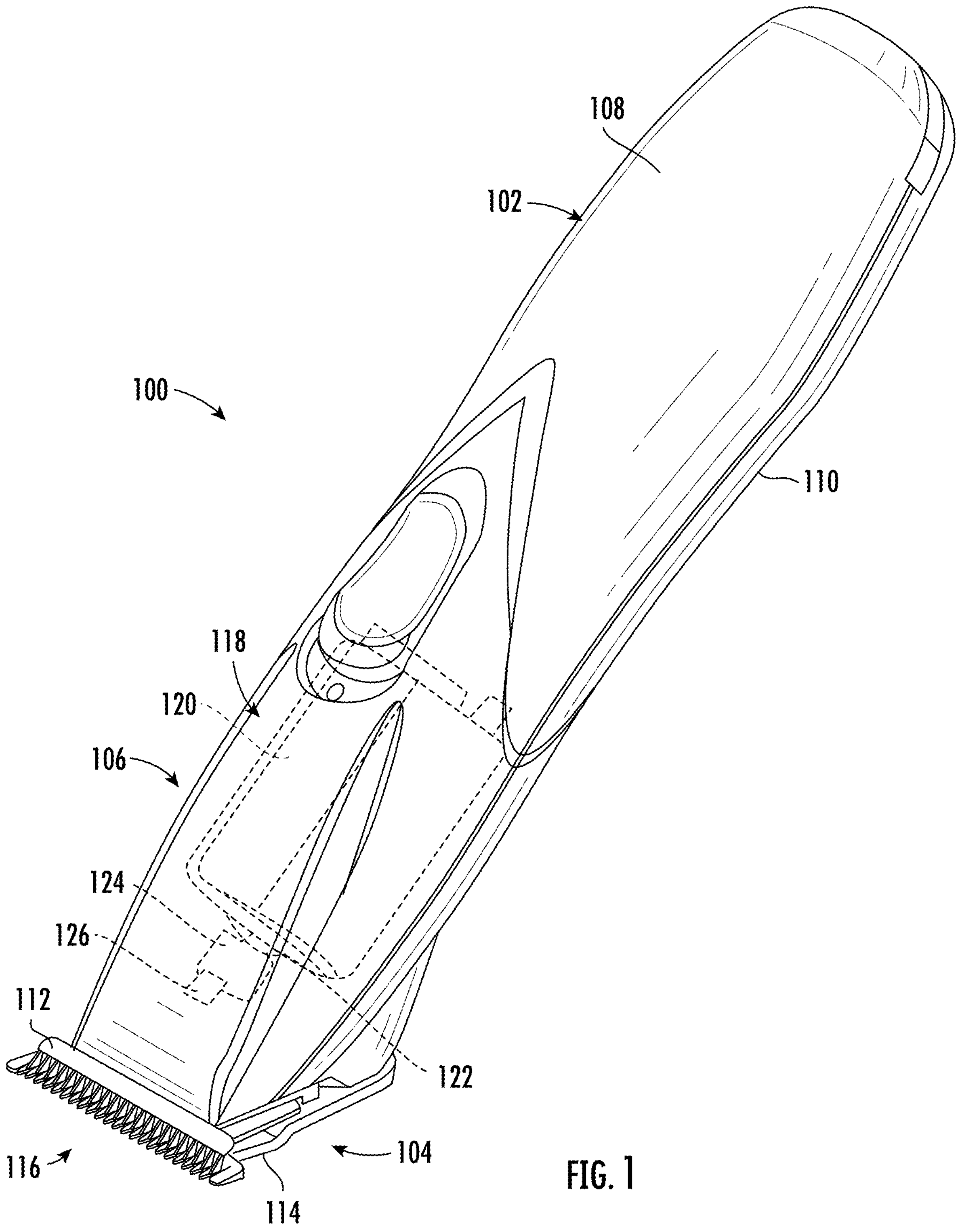
FIG. 1 is a is a perspective view of a hair cutting device, according to an exemplary embodiment.

Referring generally to the figures, various embodiments of hair cutters or clippers are shown. The cutters include a blade assembly with an upper or inner blade that oscillates relative to a lower or outer blade to cut or trim hair. The alignment of the inner blade relative to the outer blade creates competing objectives. The inner blade and outer blade need to be close enough to each other to cut hair when the inner blade teeth oscillate over the outer blade teeth. However, pressing the inner blade against the outer blade creates friction between the blades as the inner blade moves relative to the outer blade. The inner and outer blade should be pulled together so that the oscillation of the inner blade does not create interference between the cutting ends of the inner and outer blades. Proper forces (e.g., attraction, repulsion) between the blades reduces friction on the system, wear and tear on the blades, and enhances the operational life of the motor.

In conventional adjustable hair cutters, a mounting bracket and blade bracket are coupled to the blade assembly to provide a method of adjusting a blade gap (e.g., distance between teeth on inner blade and teeth on outer blade). Applicant has found that because the blade bracket is frequently formed as a stamped part there is too much slop or clearance between the mounting bracket and blade bracket. When a user pulls or moves the lever that is coupled to the mounting bracket to adjust the blade gap, this looseness between the mounting bracket and blade bracket causes inconsistent and rough motion of the inner blade. In contrast to the conventional hair cutters, Applicant has found using a magnet and/or magnetic forces (e.g., attraction, repulsion, etc.) between the mounting bracket and blade bracket can provide for a smoother and more consistent adjustment of the blade assembly. Applicant has found the magnetic force allows for better control and/or more precise incremental adjustment of the blade assembly. Further, the magnetic force allows for better control of tolerances and avoids potential interferences between components. In such embodiments, the bracket can still be formed using stamping allowing for cost effective and efficient manufacturing.

For ease of discussion and understanding, the following detailed description will refer to and illustrate the blade assembly that incorporates magnetic tensioning and/or blade set adjustment in association with a hair cutting apparatus or "cutter." It should be appreciated that a "cutter" is provided for purposes of illustration, and the blade assembly disclosed herein can be used in association with any hair cutting, hair trimming, or hair grooming device. Accordingly, the term "cutter" is inclusive, and refers to any hair grooming device including, but not limited to, a hair trimmer, a hair clipper, or any other hair cutting or hair grooming device. The cutter device can be suitable for a human, animal, or any other living or inanimate object having hair.

FIG. 1 illustrates an example embodiment of a hair cutting apparatus, trimmer, hair cutter 100. Hair cutter 100 includes a body or handle 102, a blade set or blade assembly 104, and a drive assembly 106. As illustrated in FIG. 1, handle 102 includes a clamshell configuration of two portions: a first or upper housing 108 and a second or lower housing 110. In other embodiments, handle 102 of hair cutter 100 may include other configurations. For example, upper housing 108 and/or lower housing 110 form a single integral handle 102 or component part. In other embodiments, handle 102 could join upper housing 108 and/or lower housing 110 in other clamshell configurations (e.g., from one or more sides) and may include additional parts on the top, bottom, sides, or ends of handle 102.

Blade assembly 104 includes a translating, upper, or inner blade 112 and a lower, or outer blade 114. Handle 102, housing 108 and/or 110 define a cutting end 116 that includes blade assembly 104. Handle 102 further defines a cavity 118 to support a motor 120. As illustrated in FIG. 1, cavity 118 is formed between upper housing 108 and lower housing 110 such that handle 102 surrounds drive assembly 106 and motor 120.

Drive assembly 106 is positioned within cavity 118 and couples blade assembly 104 to motor 120. In various embodiments, motor 120 is a rotary DC electric motor. In other embodiments, motor 120 is a pivot motor or a magnetic motor 120 that generates oscillating or reciprocating movement for blade assembly 104 (e.g., drive assembly 106 couples to inner blade 112 to oscillate inner blade 112 relative to the outer blade 114). In other embodiments, motor 120 is an AC electric motor or any other suitable motor for generating oscillating or reciprocating movement for a blade assembly 104, e.g., inner blade 112 and/or outer blade 114. As illustrated, motor 120 is configured to operate on battery power (e.g., cordless), but may be configured to operate with electricity from any suitable electric source, e.g., a corded hair cutter 100 plugged into an outlet.

Motor 120 couples to a rotating motor output shaft 122 that rotates about a rotational axis. An eccentric drive 124 is coupled to motor output shaft 122 and rotates eccentrically about the rotational axis. Eccentric drive 124 includes an eccentric shaft 126 that is offset from motor output shaft 122. In other words, eccentric shaft 126 is offset from the axis of rotation of motor 120, such that eccentric shaft 126 rotates non-concentrically around the axis of rotation to create an oscillatory rotational motion. Eccentric shaft 126 is configured to engage a yoke 128 (see e.g., FIG. 2) of blade assembly 104 and translate or oscillate inner blade 112 linearly. Blade assembly 104 is coupled to cutting end 116 of the handle 102. For example, blade assembly 104 may couple to handle 102 with an adhesive, a rivet, a weld, a bolt, a screw, or at least one or more fasteners.

Figure 2:
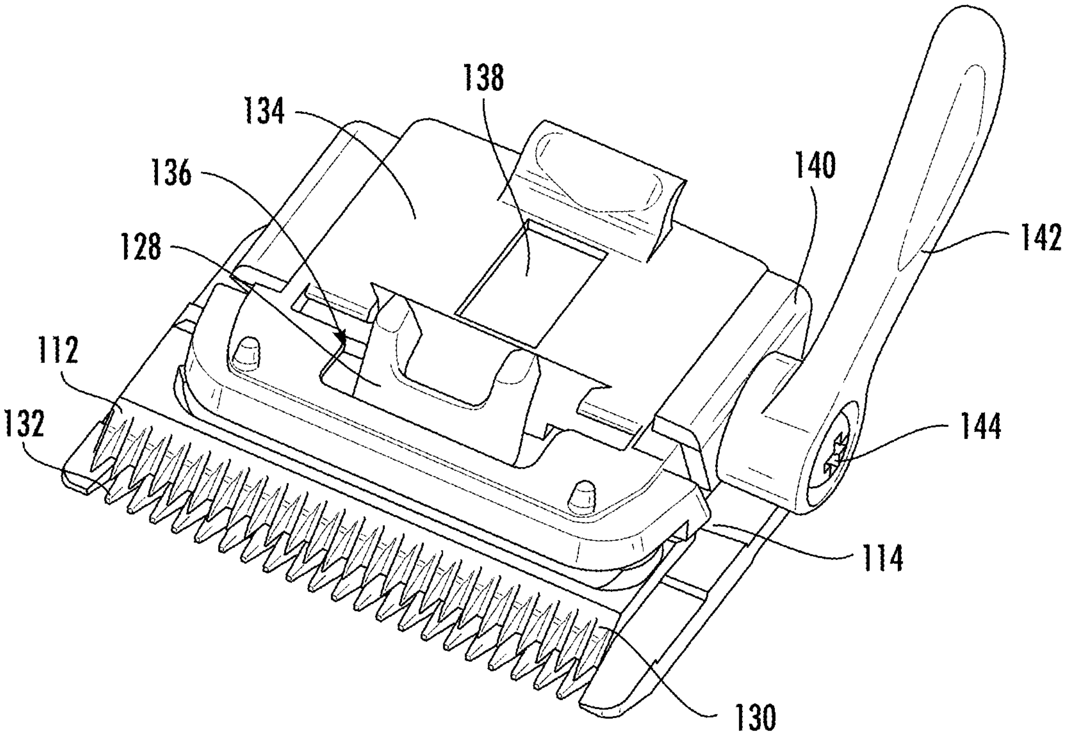
FIG. 2 is a top, front perspective view of a blade assembly with a mounting bracket.
Figure 3:
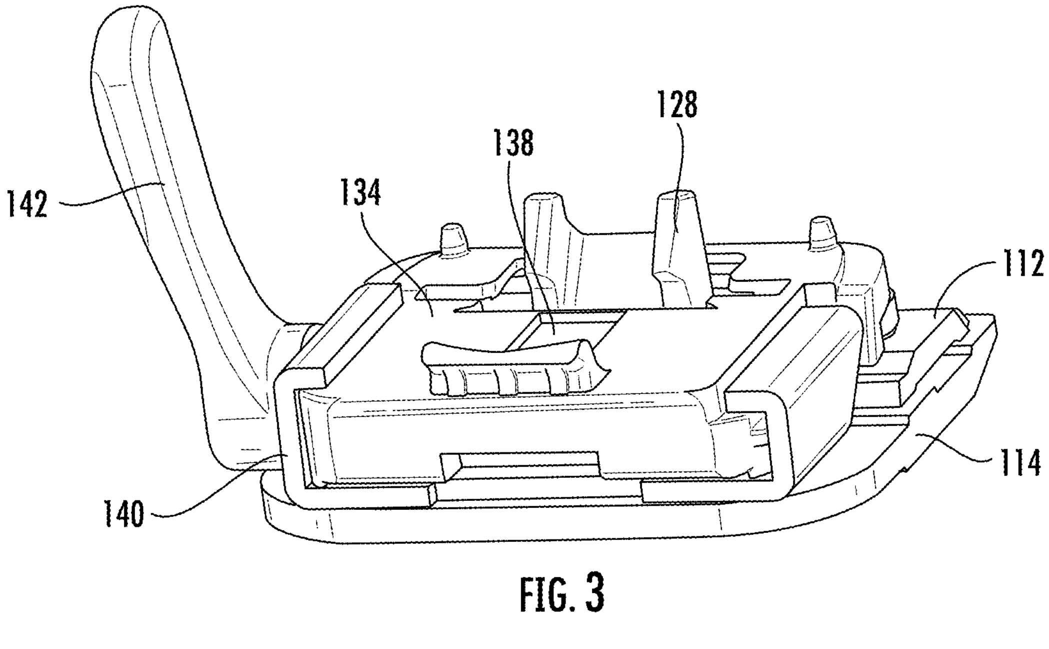
FIG. 3 is a rear perspective view of the blade assembly with the mounting bracket.
Figure 4:
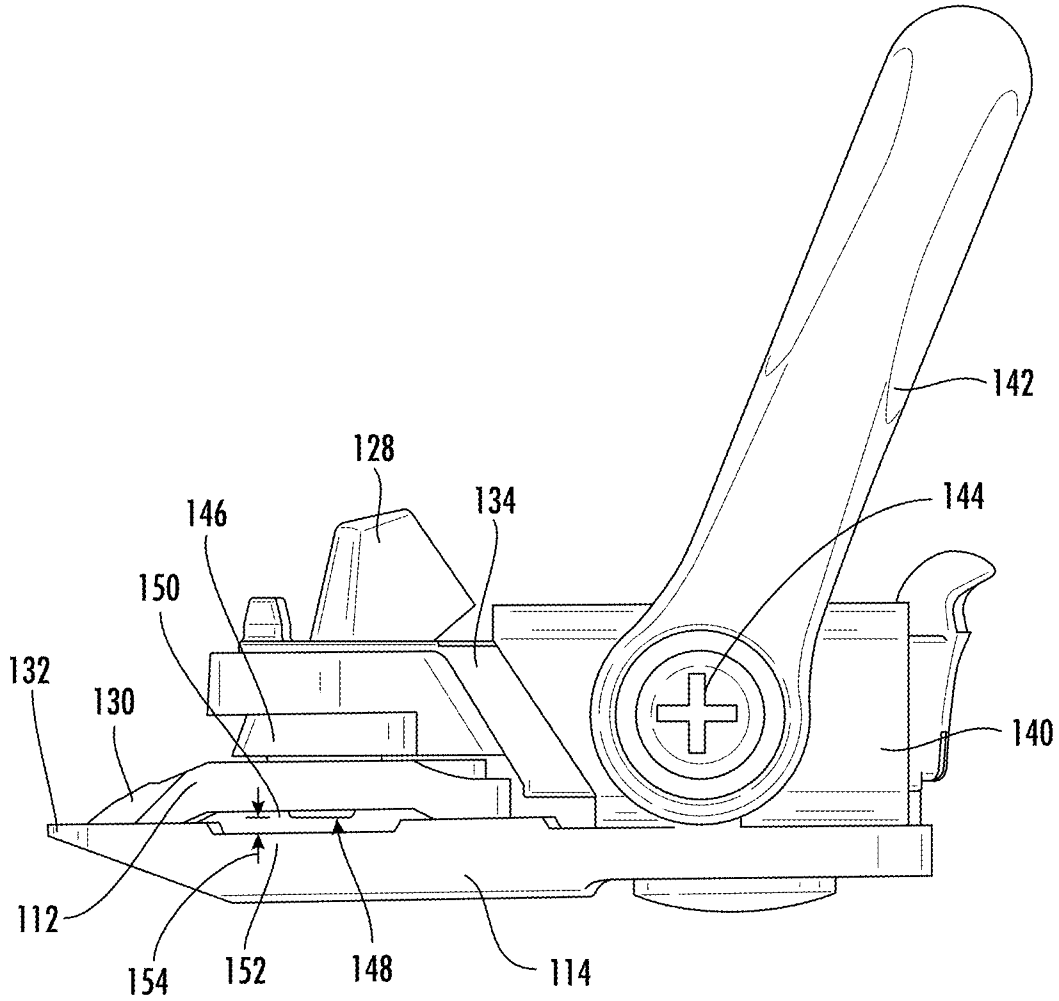
FIG. 4 is a side view of the blade assembly with the mounting bracket.

As shown in FIGS. 2-4, inner blade 112 has inner blade teeth 130 and outer blade 114 has outer blade teeth 132 oriented in the same direction or parallel to inner blade teeth 130. The inner blade teeth 130 are configured to oscillate over the outer blade teeth 132 when inner blade 112 moves over outer blade 114 to facilitate cutting. Blade assembly 104 further includes a blade attachment or mounting bracket 134 and a blade bracket or retainer 140 that is positioned around mounting bracket 134 when hair cutter 100 is assembled. Mounting bracket 134 allows for removable coupling to handle 102 of hair cutter 100. For example, a projection extending upward and reward (in the orientation shown in FIG. 2) engages the handle 102 to secure the blade assembly 104 to handle 102.

Mounting bracket 134 includes an opening or bore 136 through which the yoke 128 extends through when mounting bracket 134 is coupled to blade assembly 104. Mounting bracket 134 includes a magnetic component, shown as magnet 138 positioned in a cavity 180 (see e.g., FIG. 8) of mounting bracket 134. Mounting bracket 134 and/or yoke 128 engage a portion of inner blade 112. Magnet impacts alignment of yoke 128 and specifically coupling or mating features 147 on cross-portion 146. In various embodiments, bore 136 and/or mounting bracket 134 include mating features 135 configured to engage or guide yoke 128 and/or corresponding mating features 147 on cross-portion 146 of yoke 128. In a specific embodiment, yoke 128 engages an upward facing surface inner blade 112.

In some embodiments, a lever 142 is coupled to blade assembly 104 with a screw or fastener 144. Lever 142 facilitates movement of outer blade 114 relative to inner blade 112 in a direction away from and/or toward handle 102. This adjustment of the inner blade teeth 130 relative to the outer blade teeth 132 adjusts the length of hair cut by the inner and outer blades 112 and 114. As will be generally understood, outer blade 114 is coupled to blade bracket 140 such that movement of lever 142 adjusts the position of outer blade 114.

Figure 5:
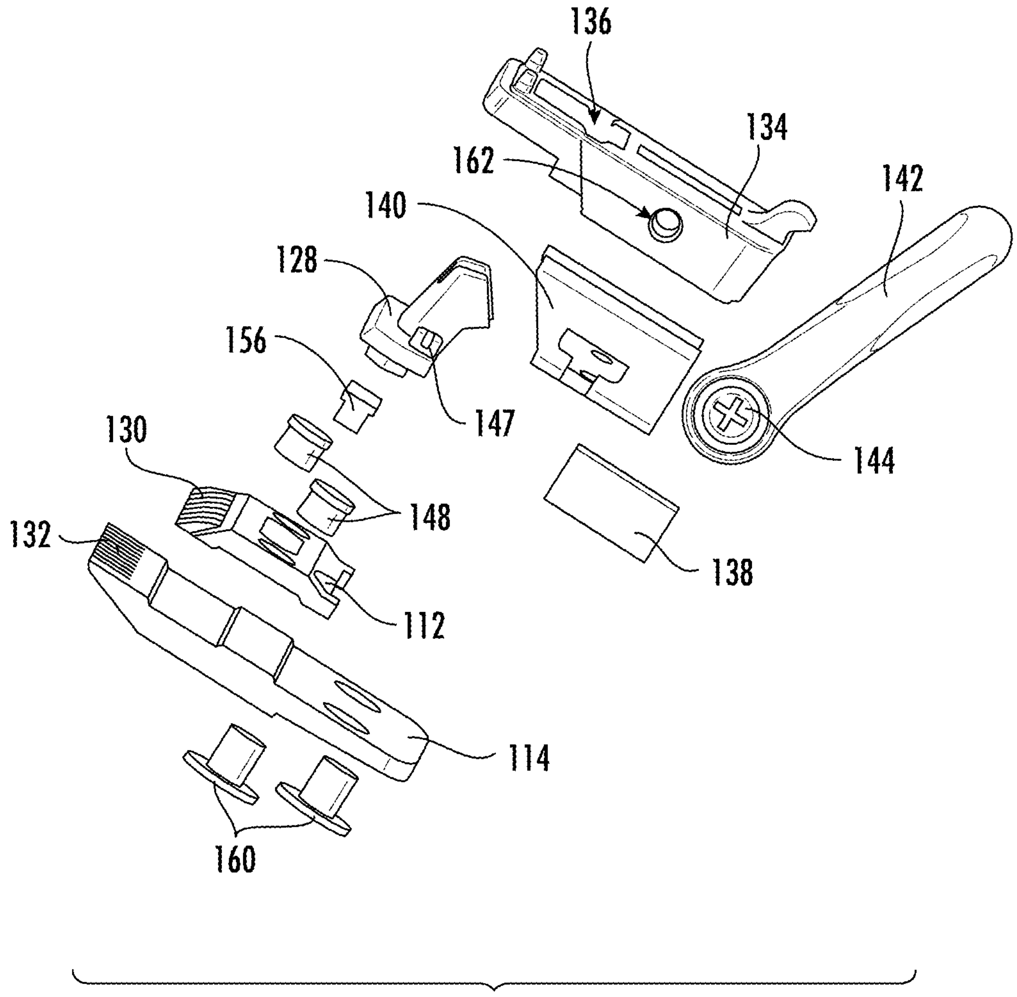
FIG. 5 is an exploded view of the blade assembly and mounting bracket.
Figure 6:
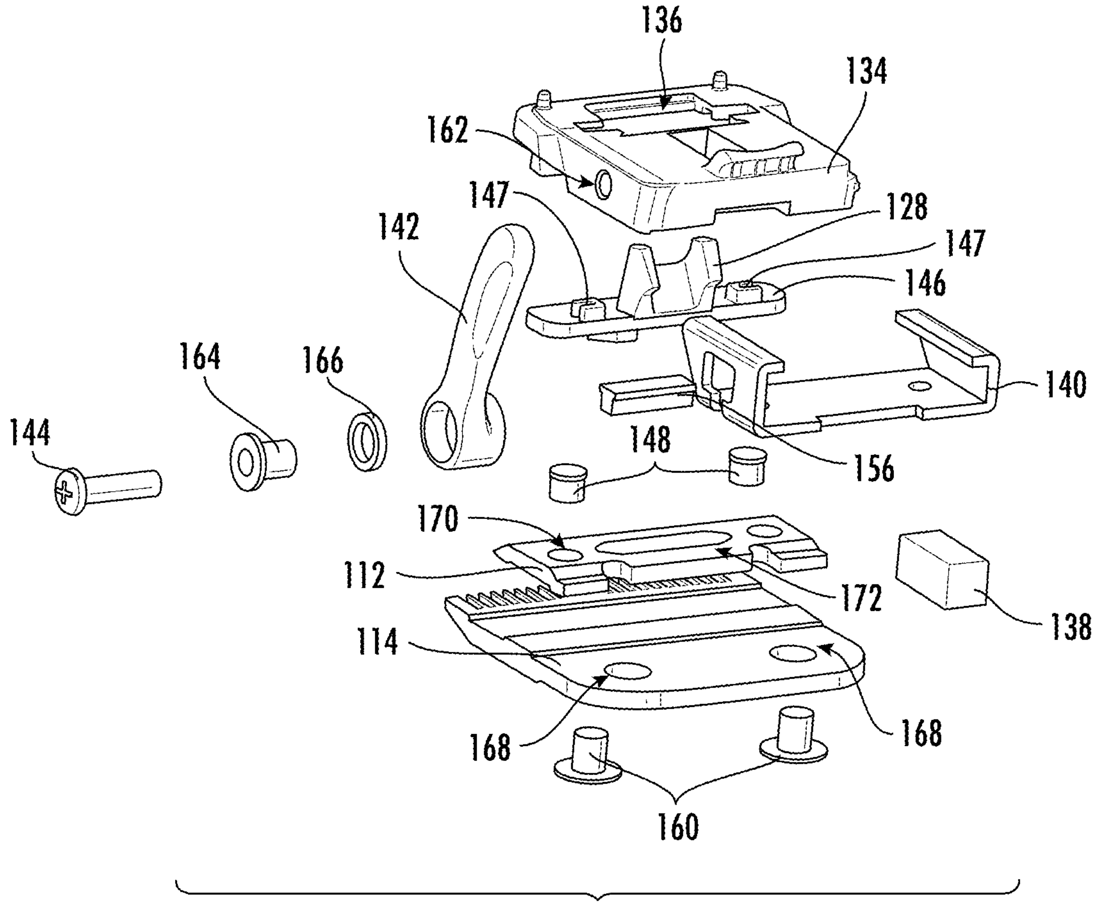
FIG. 6 is a perspective exploded view of the blade assembly and mounting bracket.

Referring to FIGS. 4-6, details of a magnetic tensioning arrangement between inner blade 112 and outer blade 114 are shown, according to an exemplary embodiment. Applicant believes the magnet designs discussed herein provide or generate a tensioning force between the inner blade 112 and the outer blade 114 that provides a more uniform tension than conventional blade tensioning structures that use springs. The spring tolerances are difficult to control and therefore provide uneven tension across the blade. Similarly, Applicant believes the magnetic tension system for the blades provides more consistent tension across the entire length of blade teeth. The magnetic blade tensioning reduces friction specifically by eliminating the spring leg interaction with the yoke body. Applicant has found this reduction in friction can be seen be improved run-time in hair cutters with battery-operated units. Additionally, Applicant believes the magnetic tensioning system provides consistent cut quality throughout the lifetime of the hair cutter blade, unlike spring tensioning systems which are set to a predetermined position, and therefore, provide less tension over time as the blades wear.

In various specific embodiments, one or more magnets 148, 156 extend through the inner cutting blade 112. In a specific embodiment, a bar magnet 156 is used in combination with a pair of round or disc shaped magnets 148. In a specific embodiment, the magnets 148 are rare earth magnets. In a specific embodiment, the magnets 148 are formed from Neodymium. In specific embodiments, the bar magnet 154 is fa rare earth magnet. In a specific embodiment, the magnet 158 is formed from Neodymium. In various embodiments, the bar magnet 156 is formed from the same material as disc magnets 148. In other embodiments, magnets 148, 154 have a different shape (e.g., polygonal, rectangular, etc.). Magnets 148, 154 are coupled to and extend downward (in a direction toward outer blade 114) from a cross-portion 146 of yoke 128. Cross-portion 146 of yoke 128 extends across at least a portion of a width of inner blade 112 when hair cutter 100 is assembled.

As shown in FIG. 4, each magnet 148, 154 includes bottom surfaces 150. Each bottom surface 150 is a downward surface that faces outer blade 114 when blade assembly 104 is fully assembled. A gap 154 is defined between bottoms surfaces 150 of magnets 148, 154 and upper surface 152 of outer blade 114. Applicant believes the tensioning force produced reduces friction and/or wear when gap 154 has a dimension or length D. In a specific embodiment, dimension D is between 0.01 and 0.030 inches.

The magnets 148, 154 generates a tensioning force between inner blade 112 and outer blade 114. As previously noted, magnets 148, 154 extends through one or more bores 170, 172 (see e.g., FIG. 6) defined in cutting blade 18.

Figure 7:
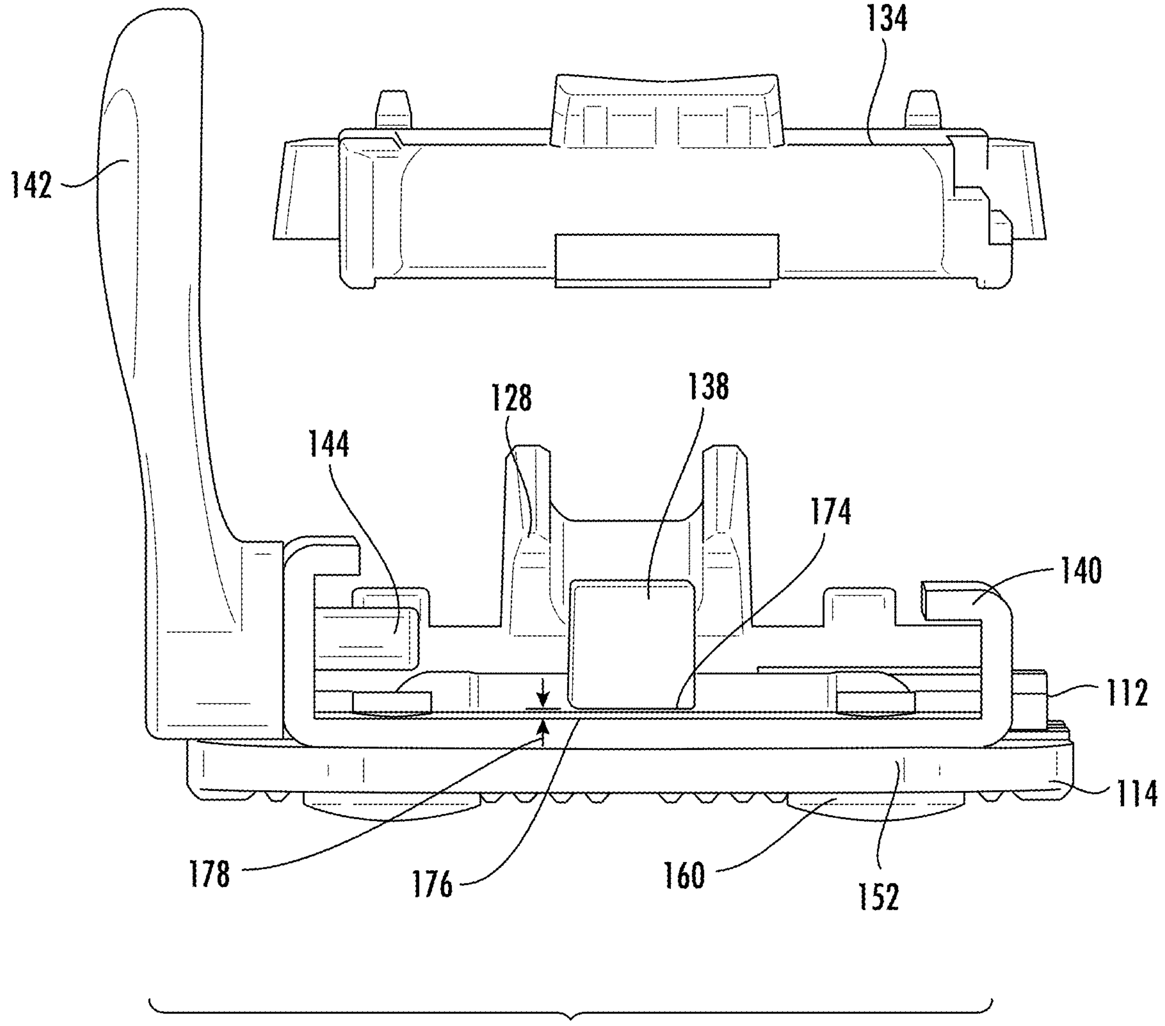
FIG. 7 is a partially exploded view of the blade assembly and mounting bracket.

Referring to FIGS. 6-7, illustrates exploded views of blade assembly 104. As previously noted, lever 142 is coupled to blade assembly 104 with a screw or fastener 144. Lever 142 is specifically coupled to blade bracket 140 and a bore 162 of mounting bracket 134. As such, when lever 142 is actuated (e.g., toward and/or or away from handle 102) the blade assembly 104 and specifically the outer blade 114 is adjustable or movable relative to inner blade 112. In other words, inner blade 112 is stationary during movement of lever 142. In various embodiments, a washer 166 and receiver 164 facilitate the coupling of lever 142 to blade assembly 104. In various embodiments, a spring and receiver 164 facilitate the coupling of lever 142 to blade assembly 104.

As previously noted, use of biasing components and specifically springs can be difficult due to difficult to control tolerances, providing less tension over time, etc., Applicant has found using magnetic tensioning for the inner blade adjustment is advantageous. Inner blade 112 includes bores 170 extending through the inner blade 112 to allow for coupling to magnets 148 and an elongate bore 172 configured to receive bar magnet 156. As previously discussed, the magnets 148, 156 provide magnetic tensioning to inner blade 112 and outer blade 114. A biasing component or spring could be utilized with the embodiments discussed herein; however, the biasing force would need to be overcome.

As shown in FIG. 6, outer blade 114 includes bores 168 configured to receive fasteners 160. When blade assembly 104 is assembled, fasteners 160 extend through outer blade 114 and couple outer blade 114 to blade bracket 140 and/or bracket 134.

Figure 8:
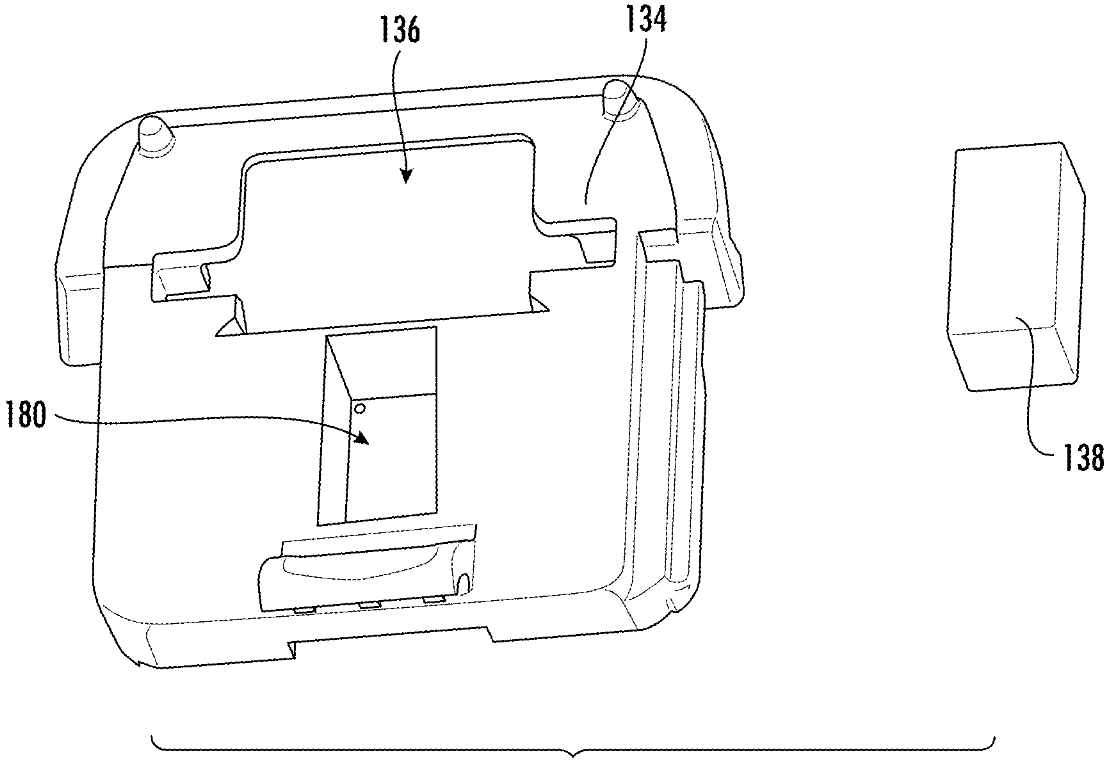
FIG. 8 is an exploded view of the mounting bracket and a magnet.
Figure 9:
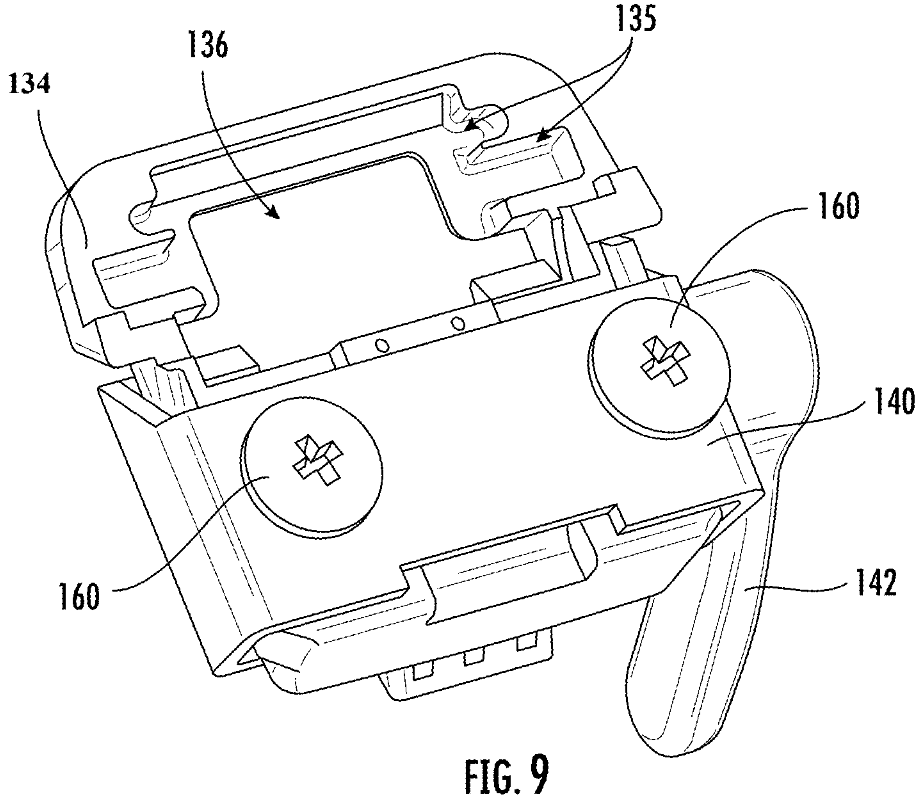
FIG. 9 is a bottom perspective view of the mounting bracket.

Referring to FIGS. 7-9, details of the magnetic forces of mounting bracket 134 and/or blade bracket 140 are shown. As shown in FIG. 3, magnet 138 is received within the mounting bracket 134 and coupled to mounting bracket 134. In various specific embodiments, magnet 138 is press fit into mounting bracket 134. In other embodiments, magnet 138 can be mounted using glue, plastic snaps, or molded to the mounting bracket 134.

When blade assembly 104 is fully assembled, a portion of mounting bracket 134 is positioned within the space between magnet 138 and blade bracket 140. In various specific embodiments, mounting bracket 134 is formed from plastic. In various specific embodiments, mounting bracket 134 is formed from a moldable plastic material. In a specific embodiment, mounting bracket 134 is formed from a glass filled nylon material. In various embodiments, blade bracket 140 is formed from metal. In various specific embodiments, blade bracket 140 is formed from one of a magnetic grade of stainless steel or carbon steel. Blade bracket 140 is produced using metal stamping. In this way, magnet 138 impacts alignment of yoke 128 and specifically coupling or mating features 147 on cross-portion 146 that are guided by mating features or recesses 135 inside mounting bracket 134.

A gap 178 is defined between the lower surface 174 of magnet 138 and an upper surface 176 of blade bracket 140. Applicant believes the force produced reduces friction and/or wear when gap 178 has a dimension or height. In various specific embodiments, the force between blade bracket 140 and mounting bracket 134 is an attractive force. In various other embodiments, the force between blade bracket 140 and mounting bracket 134 is a repulsive force. In a specific embodiment, the dimension of the gap is between 0.010 and 0.030. In such an embodiment, gap 178 is about 0.020 inches (e.g., 0.020 inches plus or minus 0.003 inches). In a specific embodiment, the size of gap 178 is less than 0.03 inches.

As will generally be understood, there are two mechanisms used in adjustable hair cutters, a mounting bracket system as previously described and a blade pad assembly. Applicant believes the magnetic blade pad assembly discussed herein provides a more consistent lever arm force. Additionally, the magnetic blade pad assembly provides more consistent blade tension by eliminating potential tolerance stack ups (i.e., cumulation of individual tolerances of components or assemblies). Furthermore, the use of a magnetic blade pad assembly eliminates potential fatigue failure of springs. Referring to FIGS. 10-21, various embodiments of a hair cutter 200 that utilizes a blade pad assembly is discussed.

Figure 10:
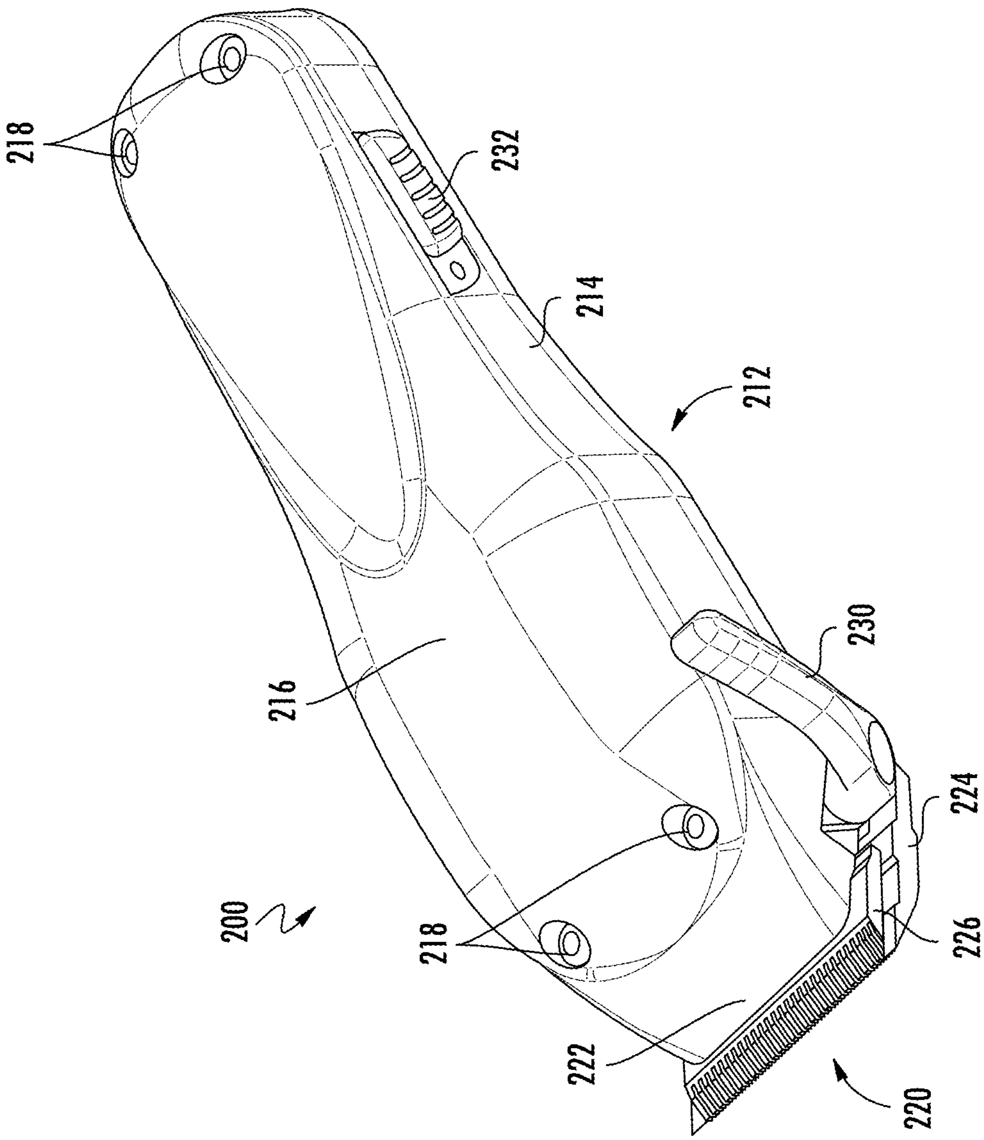
FIG. 10 is a perspective view of a hair cutting device, according to another exemplary embodiment.
Figure 11:
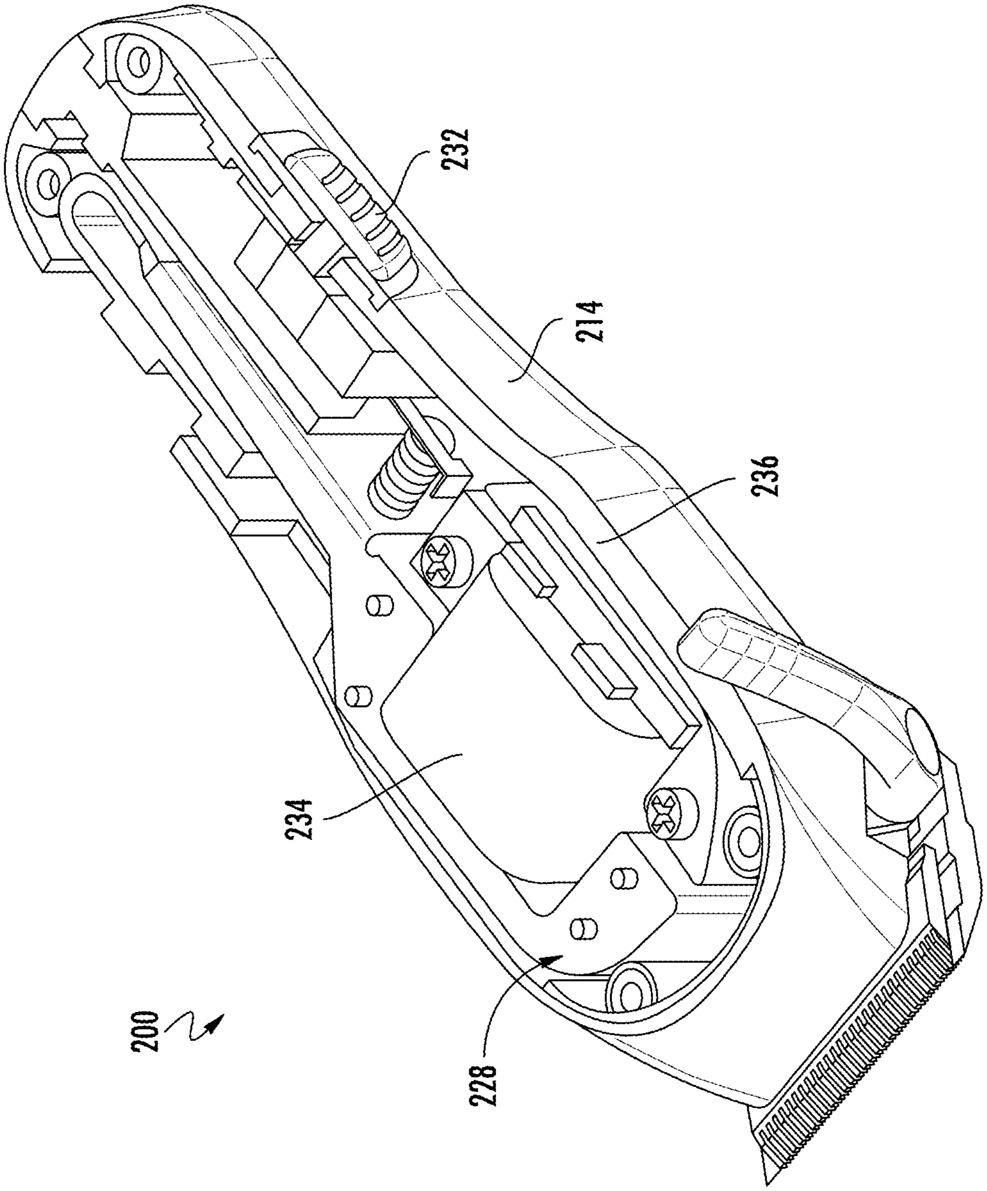
FIG. 11 is a perspective view of the hair cutter of FIG. 10 with the cover or upper housing removed.
Figure 12:
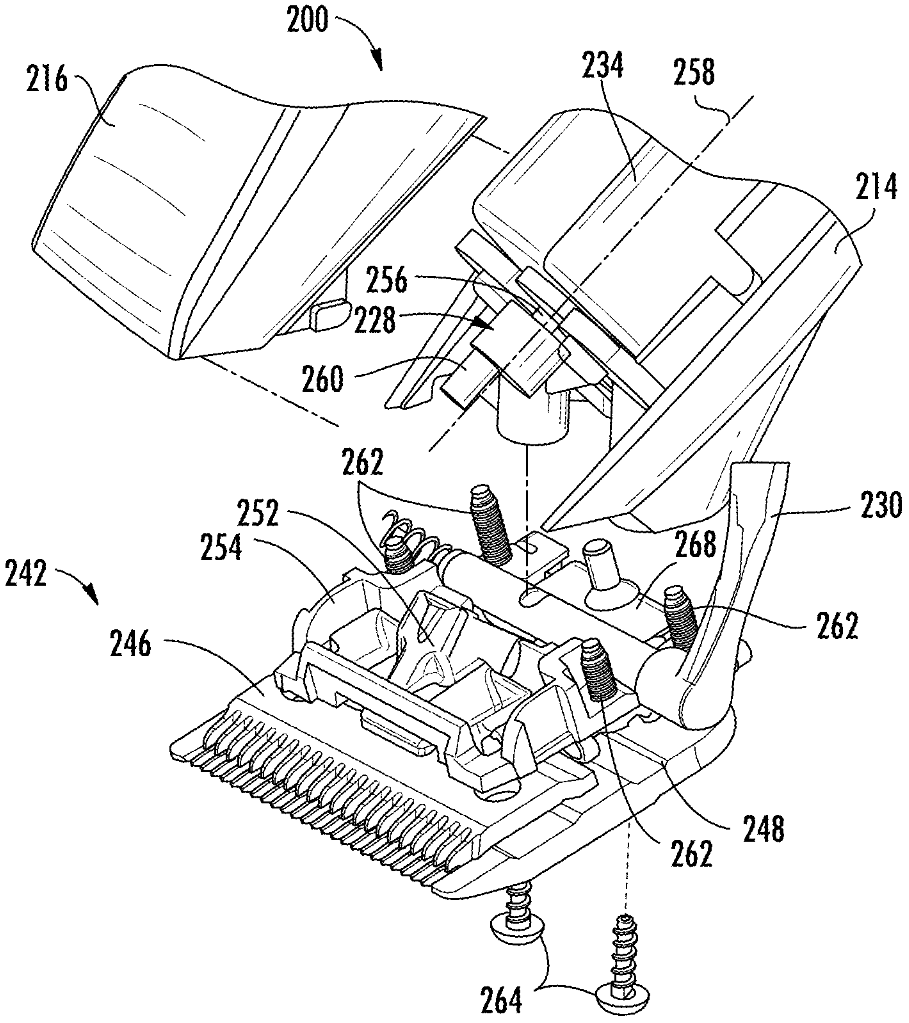
FIG. 12 is a partially exploded view with the blade assembly removed from the rest of the hair cutting device.

FIGS. 10-12 illustrates an embodiment of a hair cutter 200 having a body 212. Body 112 is defined by a first or lower housing 216 and a removable cover or upper housing 216. A plurality of fasteners 262 (e.g., bolts, screws, etc.) couple upper housing 216 to lower housing 214. In some embodiments, lower and upper housing 214 and 216 are configured to snap together to reduce or eliminate the need for fasteners. A cutting head assembly 220 is coupled to a first end 222 of body 212. The cutting head assembly 220 includes a lower plate, stationary, or outer blade 24 and an upper plate, cutter, translating, or inner blade 26 that oscillates relative to the outer blade 224. The inner blade 226 is supported on a surface of the outer blade 224 and is movable with respect to the outer blade 224. The inner blade 226 can include a drive socket (not shown) that is configured to engage a reciprocating or oscillating drive assembly 228 (shown in FIG. 11). In some embodiments, the inner blade 126 couples to other structures that engage the reciprocating or oscillating drive assembly 218. The drive assembly 218 is configured to generate oscillating or reciprocating movement of the cutting head assembly 210 to facilitate cutting of hair.

A taper lever 230 is operably connected to the cutting head assembly 220. Taper lever 230 adjusts the position of one of the outer blades 224 or inner blade 226 in relation to the other of the inner blade 226 or outer blade 224. In some embodiments, taper lever 230 couples to inner blade 226 and rotates to move teeth of inner blade 226 relative to teeth on outer blade 224 to increase or decrease a gap between inner and outer blades 226 and 224. The blade gap between inner and outer blade teeth can increase or decrease as taper lever 230 is rotated in either direction.

A power source is configured to connect to a suitable source of power, such as an outlet, battery, or another source of power. In some embodiments, the power source can be a battery (e.g., using standard battery cells, a rechargeable battery, or a lithium-ion battery) that is positioned within body 212. A switch 232 is positioned on body 212 (and more specifically lower housing 214) for powering the drive assembly 228 (shown in FIG. 11) "on" or "off." The switch 232 is user operable; for example, it can be actuated by a thumb of the user. Positioning the switch 232 into the "on" position provides power to the drive assembly 228 while positioning the switch 232 into the "off" position terminates power to the drive assembly 228.

Referring to FIG. 11, hair cutter 200 is depicted with upper housing 216 removed to illustrate drive assembly 228. In the illustrated embodiment, lower housing 214 contains drive assembly 228, which includes an electric motor 236. Electric motor 236 illustrated in FIG. 11 is a magnetic motor 236. However, in various other exemplary embodiments, electric motor 236 can be a pivot motor, a rotary motor, or any other suitable motor for generating oscillating or reciprocating movement of the cutting head assembly 220.

Blade assembly 242 includes an inner blade 226 and an outer blade 224. Inner and outer blades 226 and 224 are fabricated from a suitable material, such as a ceramic, plastic, or polymer. In some embodiments, inner and outer blades 226 and 224 are fabricated from a metal or metal alloy.

Inner blade 226 is coupled to drive assembly 228 and/or motor 236 to move to outer blade 224. Outer blade 224 can be coupled to blade pad assembly 244 (e.g., by fasteners 262). A suitable fastener 262 can be employed to secure outer blade 224 to blade pad assembly 244. Inner blade 226 is coupled to a yoke 252 that is guided or engaged by a bracket 254. Bracket 245 is coupled (e.g., by screws or a peg of bracket 254) to outer blade 224 and in some embodiments is biased toward outer blade 224. Yoke 252 receives the eccentric (e.g., eccentric drive 260 illustrated in FIG. 1) from motor 236 to cause an oscillating motion from the output of motor 236. The eccentric drive 260 inserts into yoke 252, and inner blade 226 and the bracket 254 are supported such that inner blade 226 moves back and forth across outer blade 224 in response to movement of the eccentric drive 260.

Figure 13:
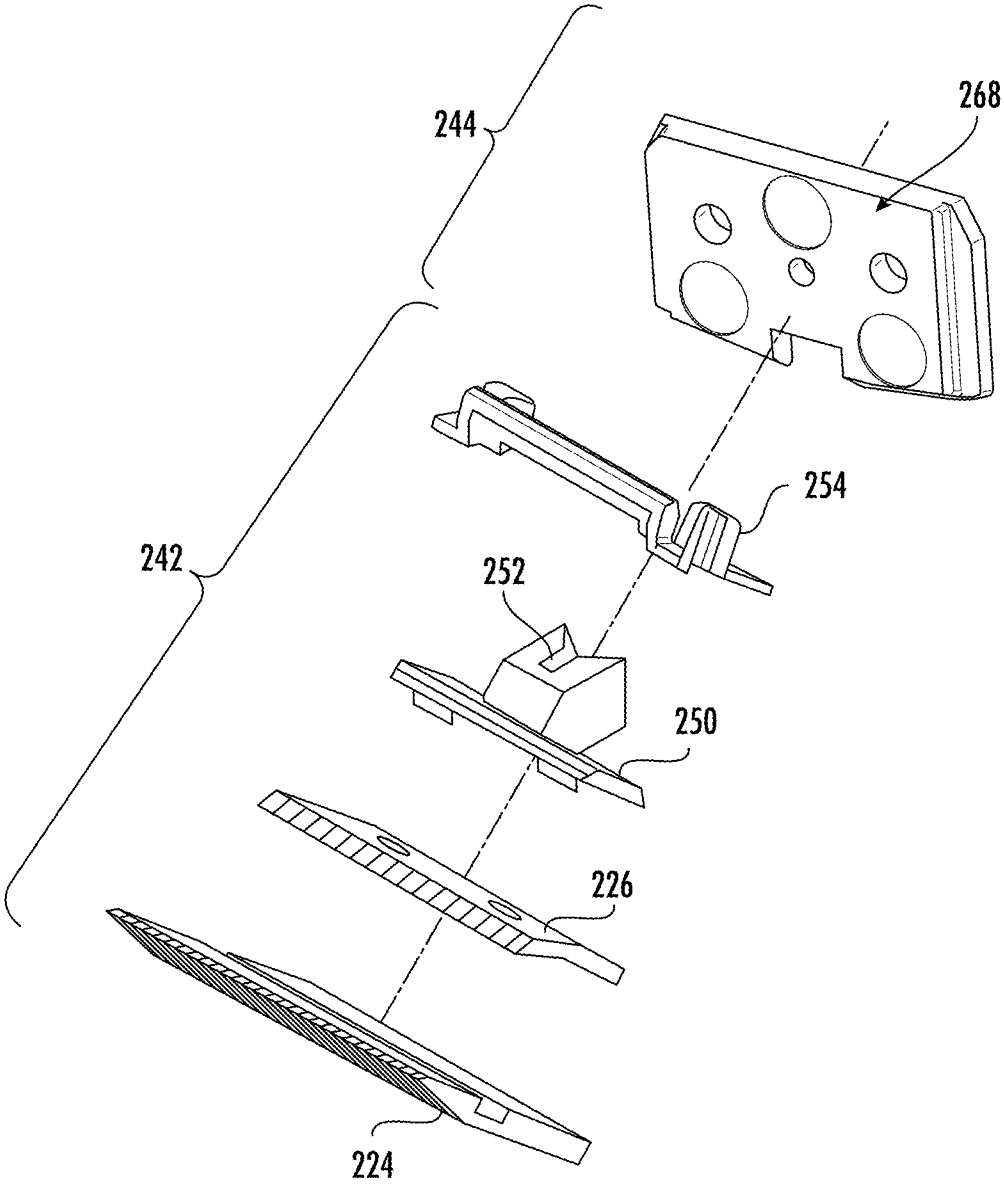
FIG. 13 is an exploded view of the blade assembly and the pad assembly.

Referring to FIG. 13, an exploded blade assembly 242 is shown. When assembled, blade assembly 242 is attached to a blade pad assembly 244 and located proximate the cutting or first end 222 of body 212.

Figure 14:
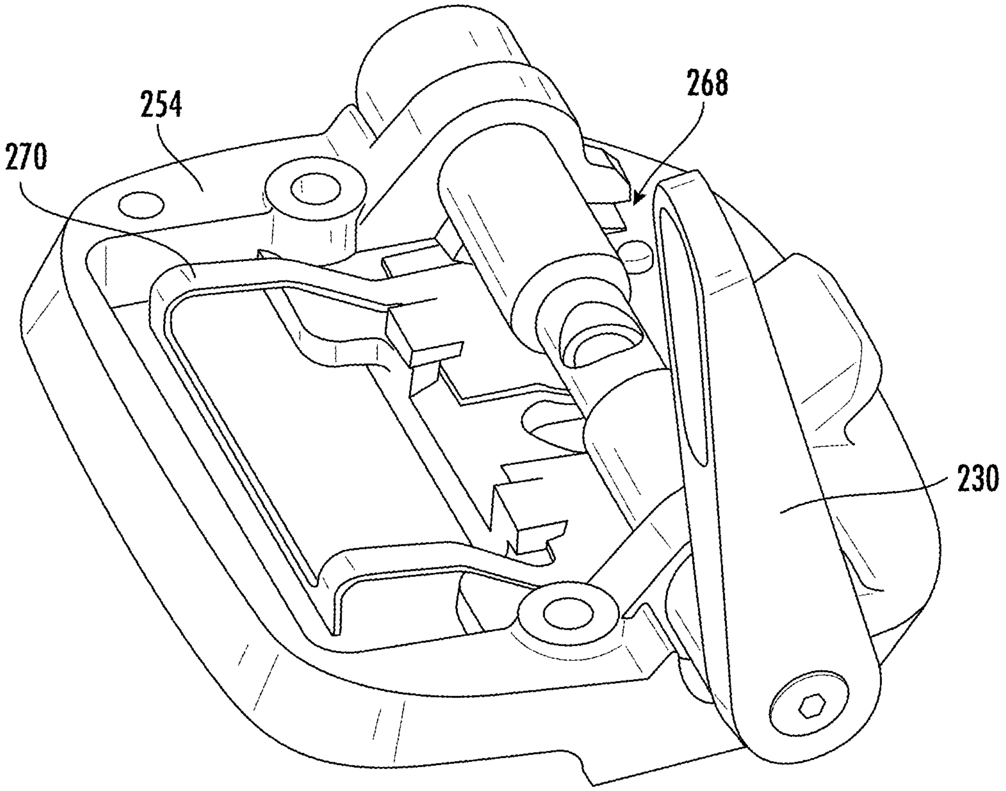
FIG. 14 is a perspective view of a mounting bracket and pad assembly with the blade assembly removed.
Figure 15:
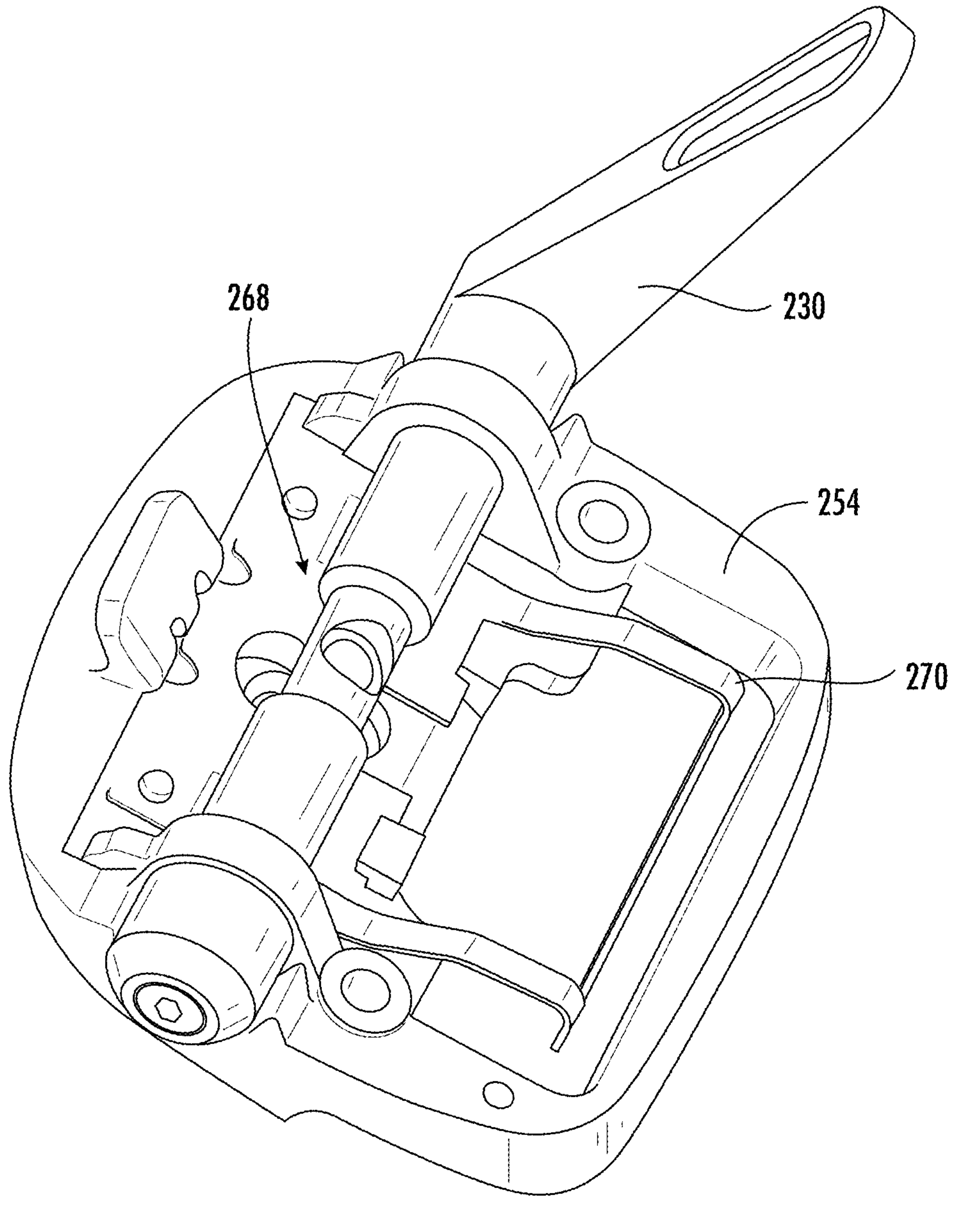
FIG. 15 is a top perspective view of a mounting bracket and pad assembly with the blade assembly removed.
Figure 16:
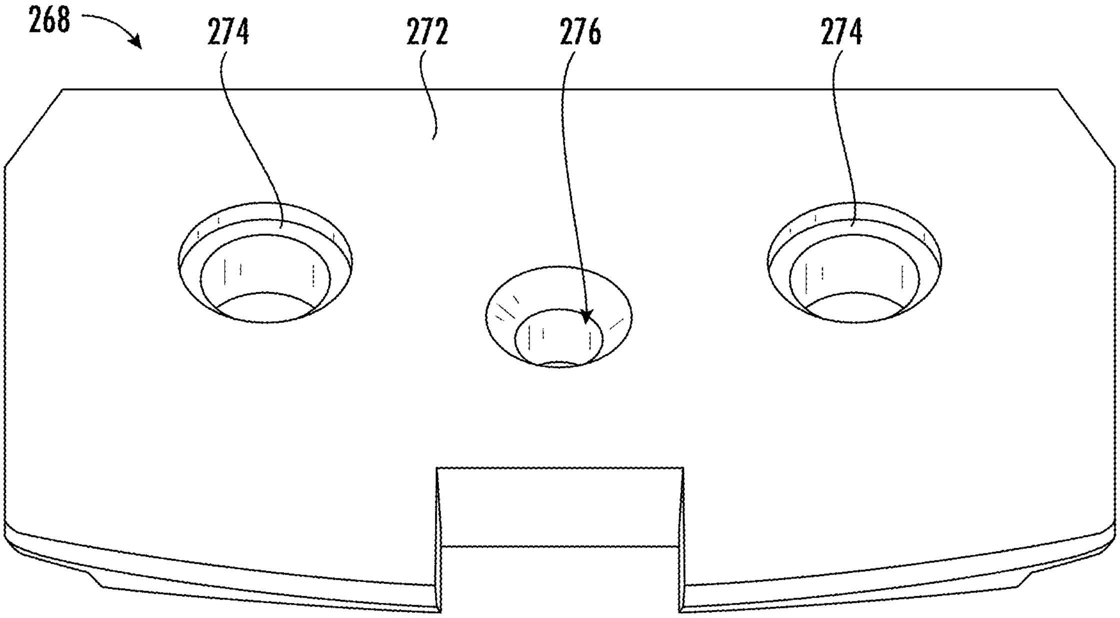
FIG. 16 is a top perspective view of the pad assembly.
Figure 17:
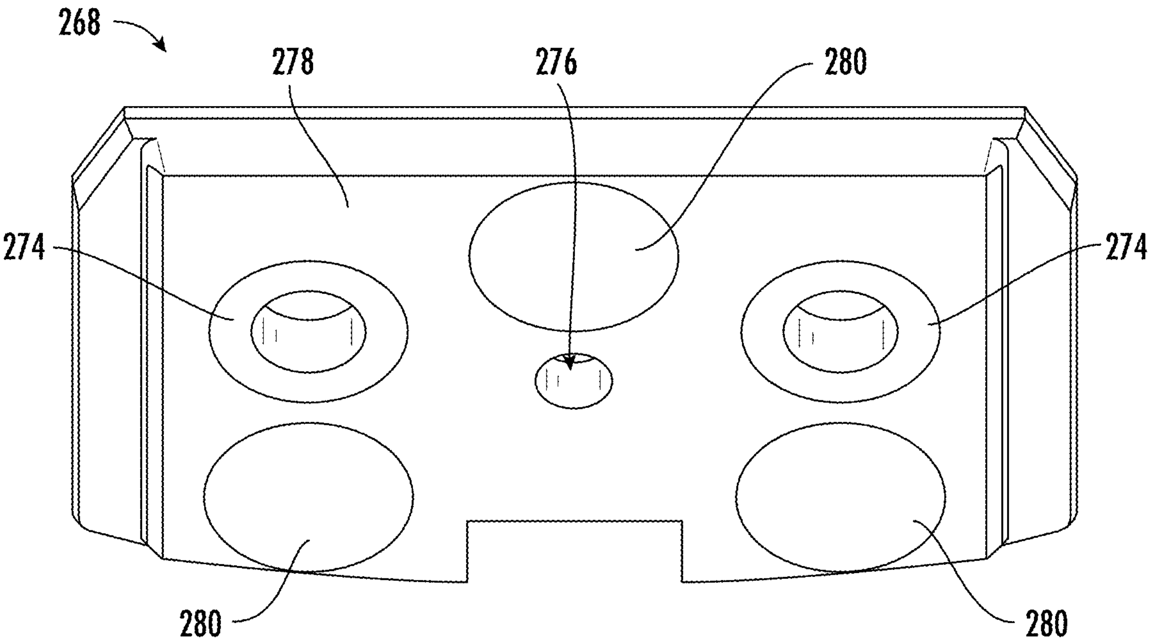
FIG. 17 is a bottom perspective view of the pad assembly.
Figure 18:
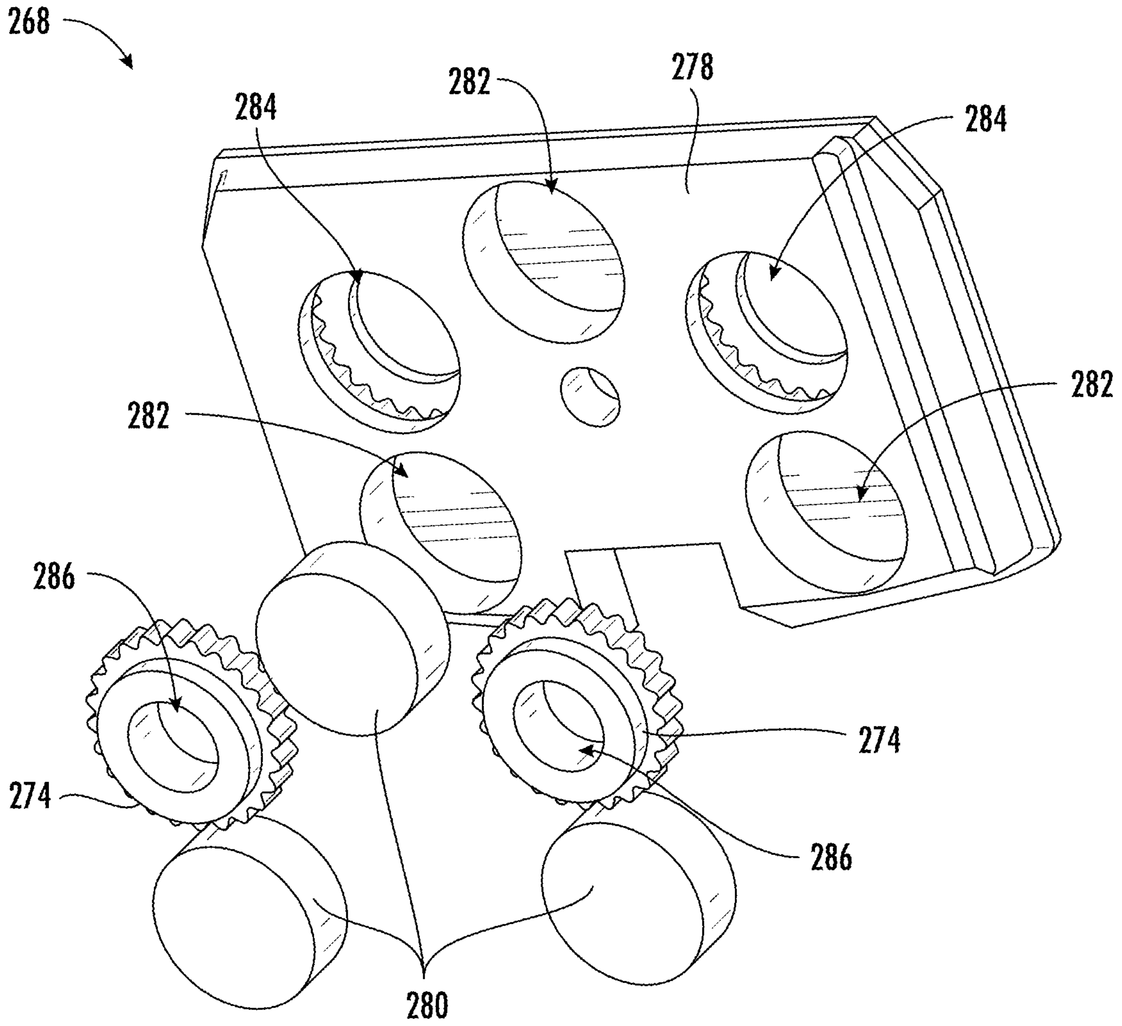
FIG. 18 is an exploded view of the pad assembly.
Figure 19:
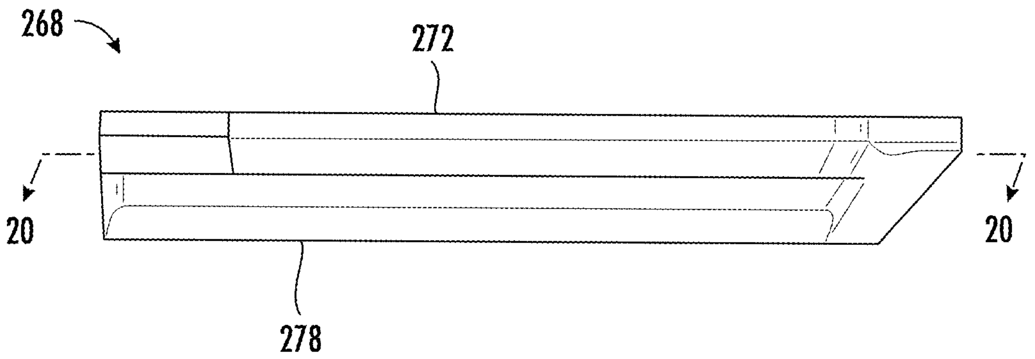
FIG. 19 is side view of the pad assembly.
Figure 20:
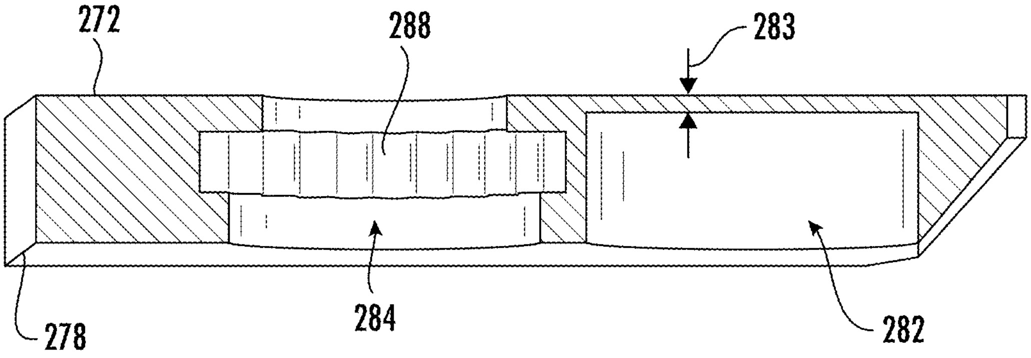
FIG. 20 is a cross-sectional view of the pad assembly taken along line 20-20 of FIG. 19 with the magnets and connectors removed.

Referring to FIGS. 14-15, perspective views of a mounting bracket 254 and a damper or blade pad 268 of blade pad assembly 244. In various embodiments a spring 270 is used to provide tension to inner blade 226. In other embodiments, a magnetic tensioning as previously discussed can be utilized. As will be discussed in greater detail below, because blade pad 268 is magnetized and/or includes magnets, the blade pad 268 provides magnetic tension relative to the lower blade.

Referring to FIGS. 16-20, details of a bracket, shown as a blade pad 268 are shown, according to an exemplary embodiment. Blade pad 268 includes an upper surface 272 with a plurality of bores 276, 284 extending through upper surface 272 and an opposing lower surface 278. In various specific embodiments, a plurality of recesses 282 are defined in lower surface 278. In other words, recesses 282 do not extend through blade pad 268. A plurality of magnets 280 are coupled to blade pad 268 and specifically positioned within recesses 282. In various specific embodiments, there are an equal number of recesses 282 and magnets 280. In a specific embodiment, there are three recesses 282 and three magnets 280. In other embodiments, a different number of recesses 282 and magnets 280.

Blade pad assembly 244 further includes a plurality of connectors 274. The connectors 274 are positioned within and coupled to bores 284. Each connector 274 has a through bore 286 extending through a generally central portion of the connector 274. In various embodiments, the connector 274 has a plurality of teeth 275 configured to engage opposing teeth 288 of the blade pad 268. The teeth 288 of blade pad 268 are positioned within a portion of bore 284.

Blade pad assembly 244 is captured between bracket 254 and housing 214 or 216 and interconnects blade assembly 242 to housing 214 and/or 216 of hair cutter 200. In some embodiments, blade pad 268 covers all or a part of inner blade 226. For example, blade pad 268 cover a rearward extending portion of inner blade 226 to dampen operating loads and/or provide a counterweight while inner blade 226 oscillates over outer blade 224. Blade pad 268 distributes operating loads of blade assembly 242 (e.g., inner and/or outer blades 226 and/or 224) to maintain a force between the blades 226 and 224.

A gap is defined between bottoms surfaces of magnets 280 and an upper surface of outer the blade 224. Applicant believes the force produced between the blade pad 268 and the outer blade 224 reduces friction and/or wear when gap has a dimension or length D2. In a specific embodiment, dimension D2 is between 0.010 inches and 0.030. A space between the magnets 280 and the mounting bracket 254 is shown by 283. The space between the upper surface of magnets 280 and a lower mounting bracket 254 includes at least a portion of blade pad 268.

Figure 21:
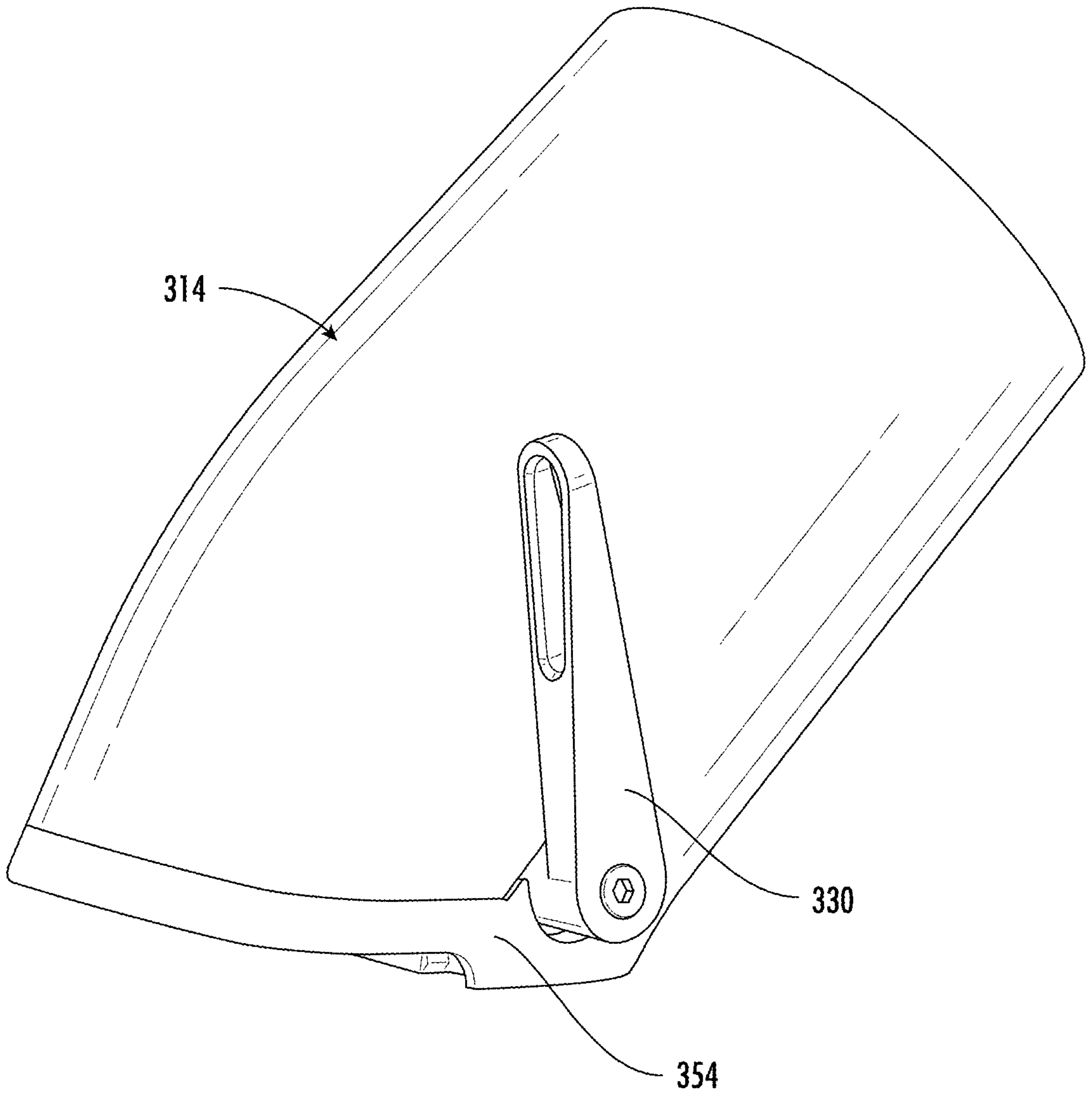
FIG. 21 is a housing for a hair cutting device and pad assembly, according to another exemplary embodiment.
Figure 22:
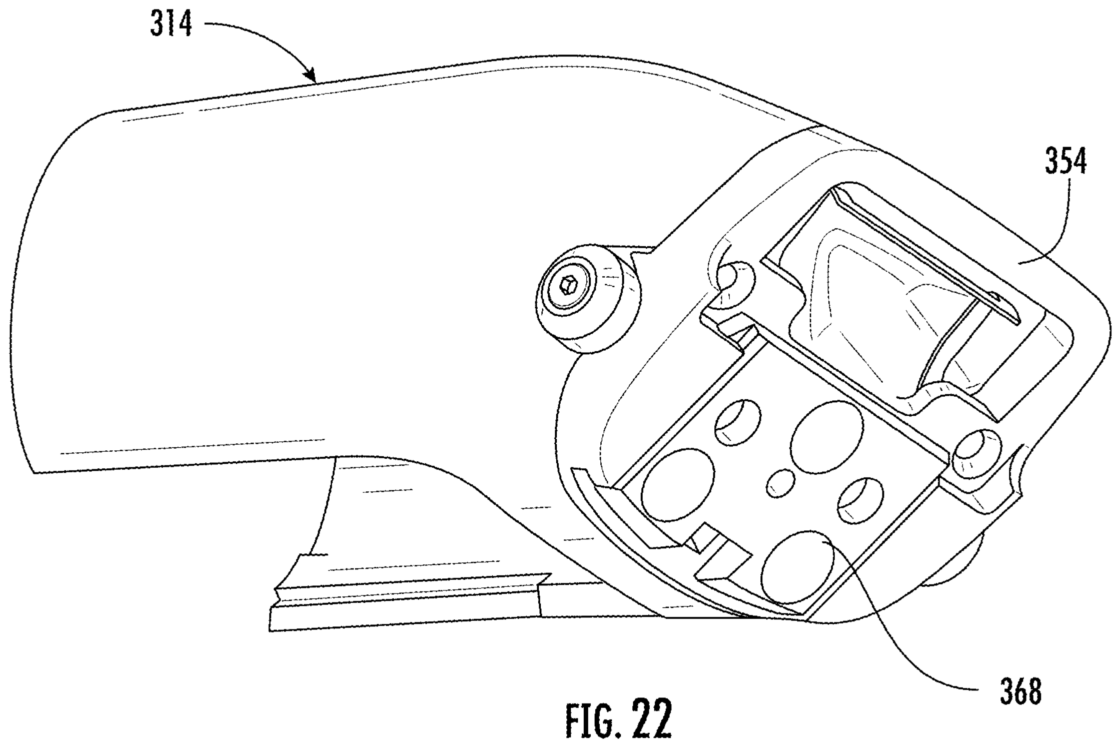
FIG. 22 is bottom perspective view of the housing for the hair cutting device and pad assembly.

Referring to FIGS. 21-22, details of engagement between the housing and blade pad assembly are shown, according to an exemplary embodiment. Bracket 354 and blade pad 368 can be utilized hair cutters 100, 200 and bracket 354 and blade pad 368 are substantially the same as mounting bracket 254 and blade pad 268 except for the differences discussed herein. A bracket 354 and lever 330 are coupled to housing 314 for a hair cutter. As illustrated, the bracket 354 is a separate component from housing 314. In other embodiments, bracket 354 and housing 314 are a single, integral component.

Figure 23:
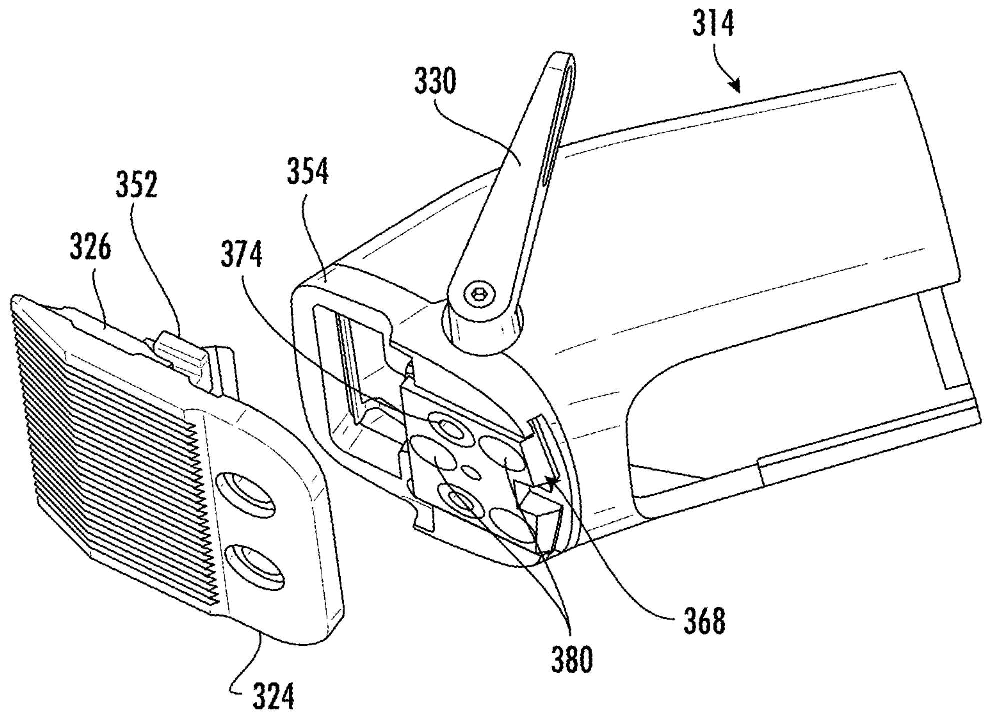
FIG. 23 is a partially exploded perspective view of the housing for the hair cutting device and a blade assembly.
Figure 24:
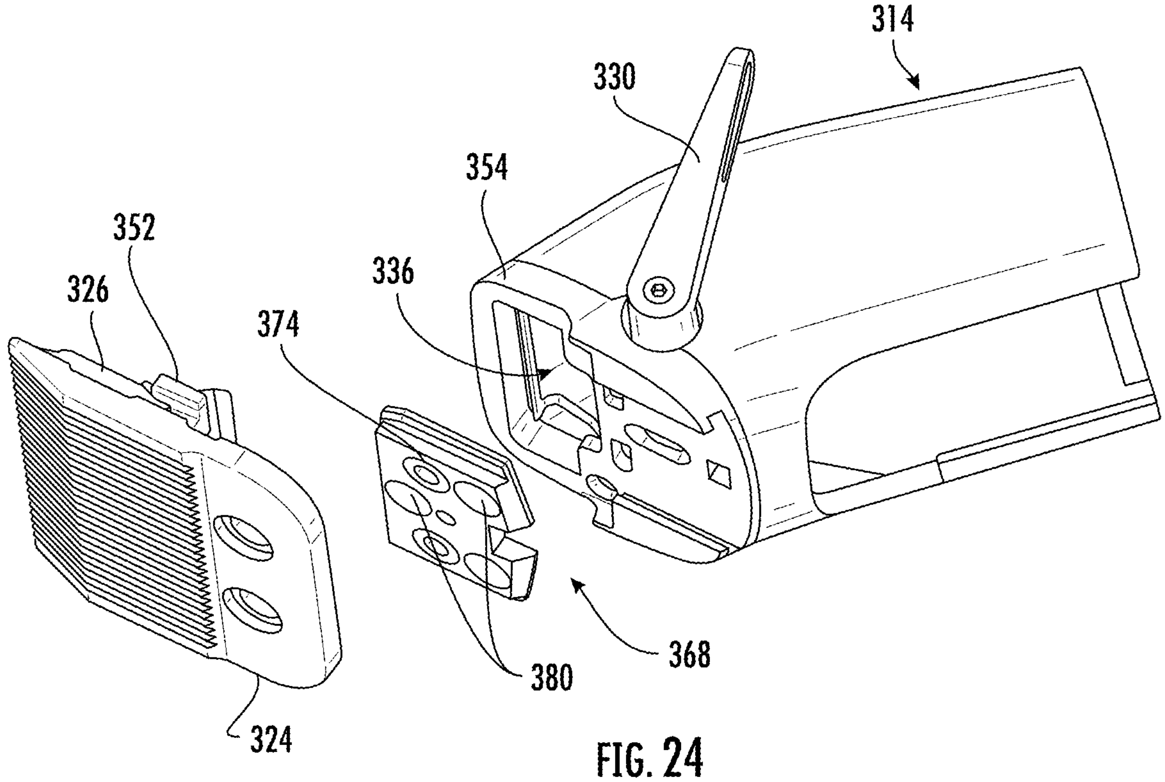
FIG. 24 is an exploded perspective view of the housing for the hair cutting device and a blade assembly.

Referring to FIGS. 23-24, details of the blade pad 368 and housing 314 relative to the blade assembly are shown according to an exemplary embodiment. As can be seen from the exploded view, the blade pad 368 is positioned and/or coupled to mounting bracket 254 such that the blade pad 368 and specifically magnets 380 will be positioned over (i.e., above) outer blade 324.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature. As used herein, "rigidly coupled" refers to two components being coupled in a manner such that the components move together in a fixed positional relationship when acted upon by a force.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles, and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A blade assembly, comprising:

an outer blade comprising outer blade teeth;

an inner blade supported relative to the outer blade, the inner blade comprising inner blade teeth having a parallel orientation to the outer blade teeth such that the inner blade teeth are moveable over the outer blade to cut hair;

a yoke coupled to the inner blade, the yoke configured to move the inner blade relative to the outer blade;

a mounting bracket configured to guide the yoke;

a blade bracket extending around the mounting bracket; and a magnet coupled to the mounting bracket;

wherein the magnet generates an attractive force between the mounting bracket and the blade bracket.

2. The blade assembly of claim 1, wherein the mounting bracket further comprising a cavity, and wherein the magnet is positioned within the cavity of the mounting bracket.

3. The blade assembly of claim 1, wherein the magnet includes a lower surface that faces an upper surface of the blade bracket and wherein a gap is defined between the lower surface of the magnet and the upper surface of the blade bracket.

4. The blade assembly of claim 3, wherein a height of the gap is between 0.010 and 0.030 inches.

5. The blade assembly of claim 1, further comprising:

a lever coupled to the mounting bracket and the blade bracket, the lever pivotable such that a distance between the inner blade teeth and the outer blade teeth is adjustable; and a blade magnet coupled to the yoke, the blade magnet extending through the inner blade such that at least a portion of the blade magnet is positioned between the inner blade and the outer blade;

wherein the blade magnet generates a tensioning force between the inner blade and the outer blade.

6. The blade assembly of claim 1, wherein the magnet is a Neodymium magnet.

7. The blade assembly of claim 1, wherein the mounting bracket is formed from plastic.

8. The blade assembly of claim 1, wherein the blade bracket is one of a metal blade bracket and a blade bracket with a metal feature.

9. The blade assembly of claim 8, wherein the metal blade bracket is formed using stamping.

10. A magnetic mounting assembly, comprising:

an outer blade comprising outer blade teeth;

an inner blade supported relative to the outer blade, the inner blade comprising inner blade teeth having a parallel orientation to the outer blade teeth such that the inner blade teeth are moveable over the outer blade to cut hair;

a yoke coupled to the inner blade;

a mounting bracket configured to engage the yoke;

a blade bracket extending around the mounting bracket, the blade bracket coupled to the outer blade;

a magnet coupled to the mounting bracket; and a lever coupled to the mounting bracket and the blade bracket, the lever pivotable such that a distance between the inner blade teeth and the outer blade teeth is adjustable;

wherein the magnet generates a force between the mounting bracket and the blade bracket.

11. The magnetic mounting assembly of claim 10, wherein the mounting bracket is formed from plastic and wherein the mounting bracket includes a cavity configured to receive and support the magnet relative to the blade bracket.

12. The magnetic mounting assembly of claim 11, wherein the mounting bracket is positioned between the magnet and the blade bracket.

13. The magnetic mounting assembly of claim 10, wherein the blade bracket is metal and formed using stamping.

14. The magnetic mounting assembly of claim 10, wherein the magnet includes a lower surface facing an upward facing surface of the blade bracket that faces away from the outer blade, and wherein a gap is defined between the lower surface of the magnet and the upward facing surface of the blade bracket and a size of the gap is less than 0.030 inches.

15. A blade assembly, comprising:

an outer blade comprising outer blade teeth;

an inner blade supported relative to the outer blade, the inner blade comprising:

inner blade teeth along a front edge; and a rear edge opposite the front edge, the inner blade teeth having a parallel orientation to the outer blade teeth such that the inner blade teeth are moveable over the outer blade to cut hair;

a yoke coupled to the inner blade;

a mounting bracket configured to engage the yoke;

a bracket coupled to the mounting bracket;

a magnet positioned within at least one of the bracket and the mounting bracket and located above the outer blade, the magnet positioned behind the rear edge of the inner blade; and a lever coupled to the mounting bracket, the lever pivotable such that a distance between the inner blade teeth and the outer blade teeth is adjustable.

16. The blade assembly of claim 15, further comprising:

a blade magnet coupled to the yoke, the blade magnet extending through the inner blade such that at least a portion of the blade magnet is positioned between the inner blade and the outer blade;

wherein the blade magnet generates a tensioning force between the inner blade and the outer blade.

17. The blade assembly of claim 16, wherein the magnet and the blade magnet are both rare earth magnets.

18. The blade assembly of claim 15, wherein the magnet includes a lower surface that faces an upper surface of the outer blade and wherein a gap is defined between the lower surface of the magnet and the upper surface of the outer blade.

19. The blade assembly of claim 18, wherein at least a portion of the bracket is positioned between the magnet and the mounting bracket.

20. The blade assembly of claim 15, wherein the magnet generates a force between the outer blade and the bracket.

* * * * *